United States Patent
Hendricks et al.

(10) Patent No.: US 6,290,191 B1
(45) Date of Patent: Sep. 18, 2001

(54) CHAIR BASE

(75) Inventors: John L. Hendricks; Nancy A. Funk, both of Grand Rapids, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 09/377,463

(22) Filed: Aug. 19, 1999

(51) Int. Cl.$^7$ .................................................. F16M 11/20
(52) U.S. Cl. ..................................... 248/188.1; 248/188.7
(58) Field of Search ........................... 248/188.1, 188.8, 248/188.9, 188.91, 346.03, 163.1, 188.7, 415, 519; 297/445.1, 463.2

(56) References Cited

U.S. PATENT DOCUMENTS

| | | | |
|---|---|---|---|
| 2,172,019 | * 9/1939 | Brainard | 248/188.7 |
| 2,617,617 | * 11/1952 | Krastel et al. | 248/188.1 X |
| 2,913,208 | * 11/1959 | McKinley | 248/188.7 |
| 2,978,780 | * 4/1961 | Clarkson | 248/188.1 X |
| 3,705,704 | * 12/1972 | Textoris | 248/188.7 |
| 4,084,776 | 4/1978 | Cook . | |
| 4,412,667 | 11/1983 | Doerner . | |
| 4,653,710 | * 3/1987 | Dickison | 248/188.7 |
| 4,712,758 | * 12/1987 | Cuschera | 248/188.7 |
| 4,728,067 | * 3/1988 | Steinmetzer et al. | 248/188.7 |
| 4,744,538 | * 5/1988 | Hofman | 248/345.1 |
| 4,821,986 | * 4/1989 | White | 248/188.7 |
| 4,911,391 | * 3/1990 | Ellis | 248/188.7 |
| 4,925,140 | * 5/1990 | Camarota | 248/188.8 |
| 5,044,299 | * 9/1991 | Frank | 297/345.1 |
| 5,048,780 | * 9/1991 | Borsani | 248/188.7 |
| 5,149,035 | * 9/1992 | Bonnema et al. | 248/188.7 |
| 5,284,312 | 2/1994 | Dony . | |
| 5,402,973 | * 4/1995 | Haines | 248/188.7 |
| 5,556,170 | 9/1996 | Lai et al. . | |
| 5,692,715 | * 12/1997 | Hertel | 248/188.8 |
| 5,740,997 | 4/1998 | Van Wieran . | |
| 5,765,804 | 6/1998 | Stumpf et al. . | |
| 5,791,611 | * 8/1998 | Battey et al. | 248/188.1 |
| 5,833,182 | 11/1998 | Maus . | |
| 5,833,322 | 11/1998 | Barandiaran . | |
| 5,865,542 | 2/1999 | Ryu . | |
| 5,906,343 | 5/1999 | Battey et al. . | |

* cited by examiner

Primary Examiner—Daniel P. Stodola
Assistant Examiner—Jennifer E. Novosad
(74) Attorney, Agent, or Firm—Price Heneveld Cooper DeWitt & Litton

(57) ABSTRACT

A chair base includes a tapered tubular center hub defining a longitudinal centerline and a plurality of radially extending tubular legs. Each leg has top, bottom, and opposing sidewalls defining a rectangular cross section that decreases as the leg extends from the hub. The top and bottom walls each have an arcuately shaped end that is welded to the center hub by top and bottom ring welds. The sidewalls of each leg have enlarged wall sections that are flat and parallel and further have bent flanges adjacent the hub that are angled inwardly from the enlarged wall sections toward the longitudinal centerline. The bent flanges are oriented approximately radially from the centerline to provide optimal structure and to provide clearance between adjacent legs. The clearance prevents interference between adjacent legs despite dimensional variation in the legs from manufacturing and tolerance considerations, thus facilitating assembly. The hub is formed from a constant-thickness wall to define a tapered one-piece tubular shape, with the constant-thickness wall having an inner surface defining a larger upper diameter and a smaller lower diameter for mateably receiving and stably supporting a tapered chair-supporting post.

13 Claims, 3 Drawing Sheets

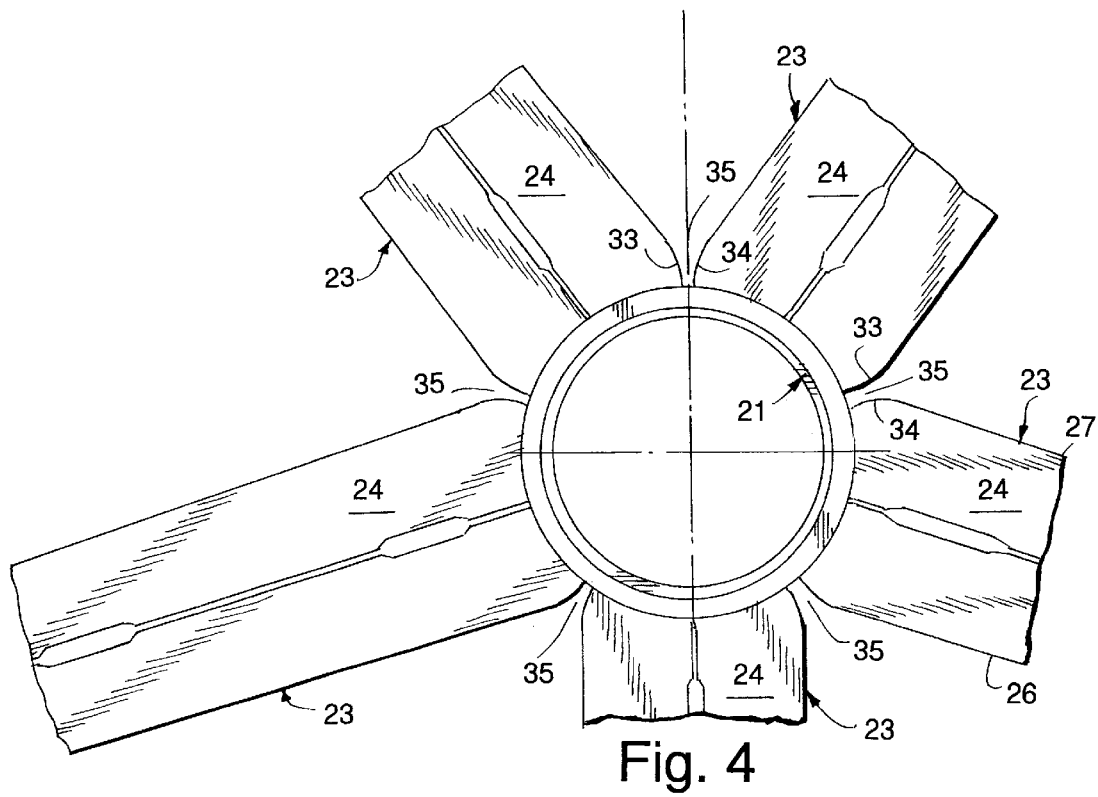
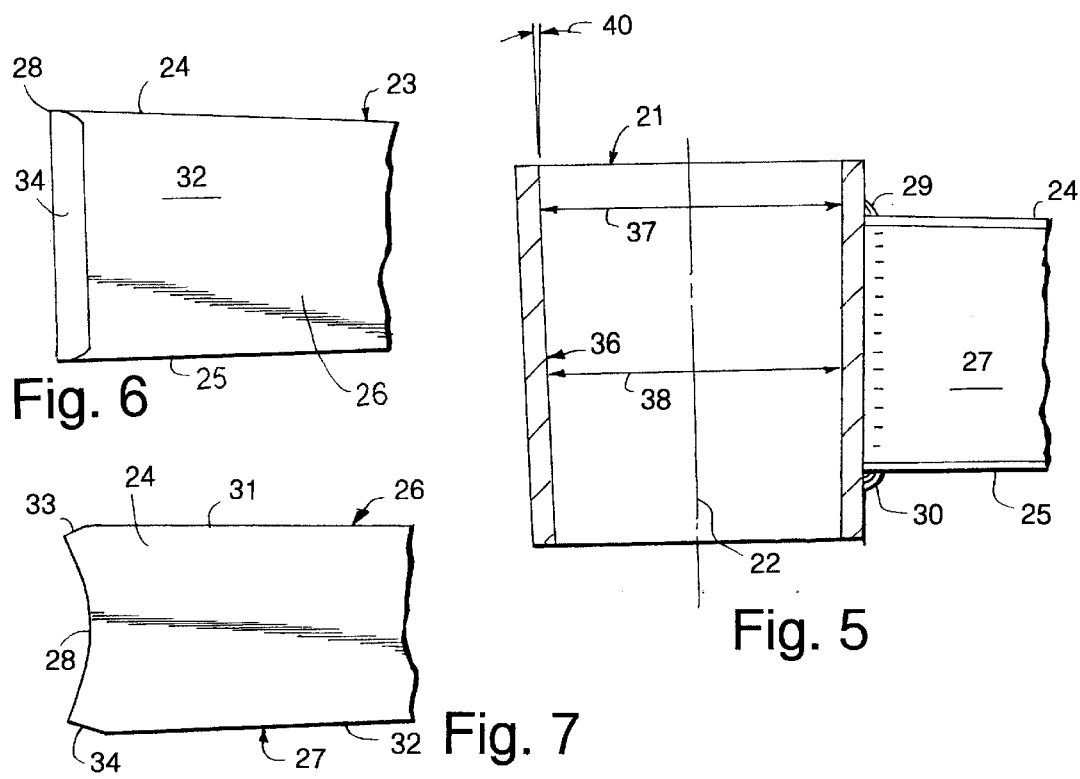

CHAIR BASE

BACKGROUND OF THE INVENTION

The present invention relates to chair bases, and more particularly to a chair base with radially extending legs and a hub that is adapted to support a pedestal-type chair.

Chair bases with radially extending, castored legs are often used to support mobile office chairs. Castors are supported at the outer end of each leg, and the inner end of the legs are welded to a tubular sleeve-like center hub to form a "spider frame" base frame. The result is that the legs and the center hub undergo considerable cantilever-type stress when loaded by a person sitting in the chair. Spider-frame base constructions are desired that minimize the number and cost of parts and pieces, yet that provide adequate strength to support both the individual load that occurs from a seated user and a chair, and to provide optimal distribution of stress to support cyclical loading that occurs from repeated use. Often, relatively minor shape changes can result in significant advantages in stress distribution and can aid the manufacturing processes.

U.S. Pat. No. 5,906,343 discloses a chair base where tubular legs having a rectangular cross-sectional shape are welded to a sleeve-type center hub by top and bottom ring welds. In U.S. Pat. No. 5,906,343, the sidewalls are not welded together, but instead are abutted against each other and against the hub in a manner that stabilizes each other. A potential problem is that the dimension between opposing sidewalls of the tubular legs in U.S. Pat. No. 5,906,343 must be closely controlled. Otherwise, the space remaining for the "last" tubular leg that is to be arranged against the center hub between the other tubular legs (i.e., prior to welding) will be problematic. Specifically, if the remaining space is too small, the "last" tubular leg will interferingly engage other tubular legs and will not fit against the hub. On the other hand, if the remaining space is too large, the "last" tubular leg will not fit snugly into the remaining space, such that at least one of the sidewalls will not abut the sidewalls of the adjacent tubular legs.

Accordingly, a chair base solving the aforementioned problems is desired.

BRIEF DESCRIPTION OF THE DRAWINGS

FIG. 4 is an enlarged fragmentary view of the area around the hub as shown in FIG. 2;

FIG. 5 is an enlarged fragmentary view of the area around the hub as shown in FIG. 3;

FIGS. 6 and 7 are fragmentary views of the hub-engaging end of the tubular leg as shown in FIGS. 3 and 4, respectively.

SUMMARY OF THE INVENTION

In one aspect of the present invention, a chair base includes a tubular center hub defining a longitudinal centerline and a plurality of radially extending tubular legs. Each leg has a top wall, a bottom wall, and opposing sidewalls. The top and bottom walls each have an arcuately shaped end adjacent the center hub. The sidewalls of each leg have enlarged wall sections that are flat and parallel, and further have bent flanges adjacent the hub that are angled inwardly from an associated one of the enlarged wall sections toward the longitudinal centerline.

These and other features and advantages of the present invention will be further understood and appreciated by those skilled in the art by reference to the following specification, claims, and appended drawings.

DETAILED DESCRIPTION OF PREFERRED EMBODIMENT

Figure 1:
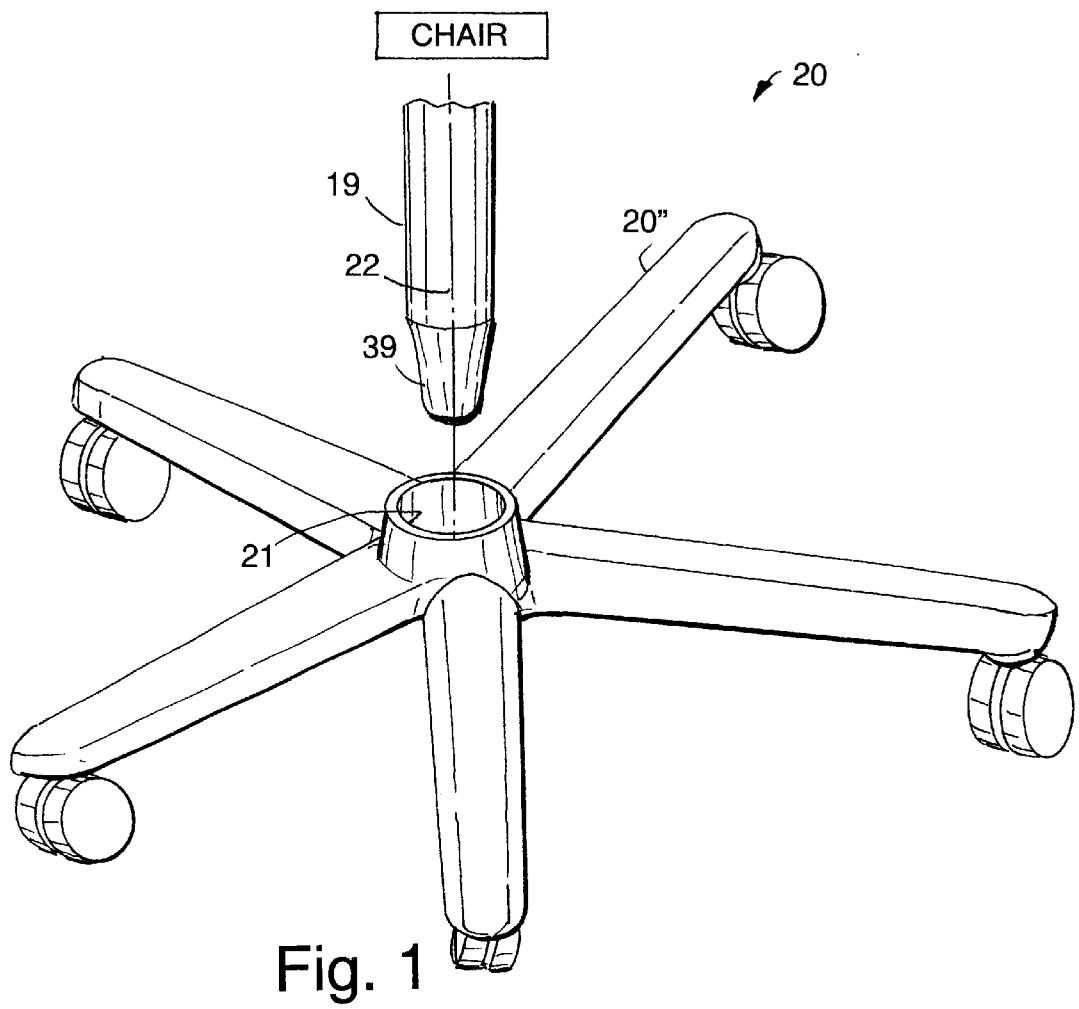
FIG. 1 is an exploded perspective view of a chair base embodying the present invention.
Figure 8:
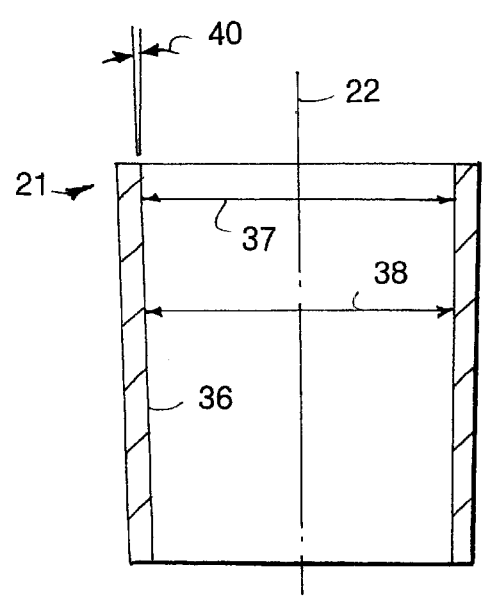
FIG. 8 is a cross section of the hub alone taken along the line VIII—VIII.
Figure 2:
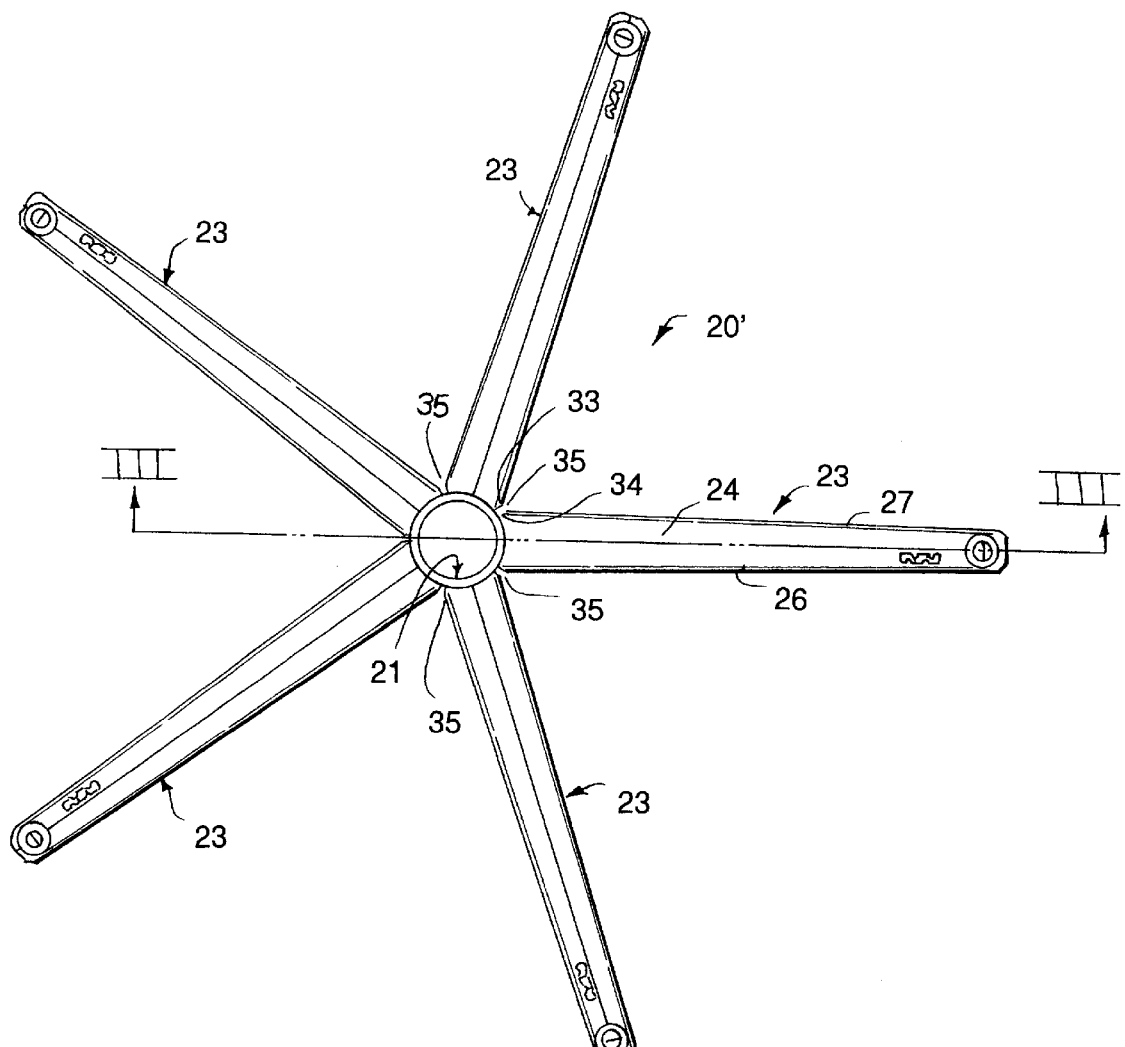
FIG. 2 is a top view of the base frame of the chair base shown in FIG. 1.
Figure 3:
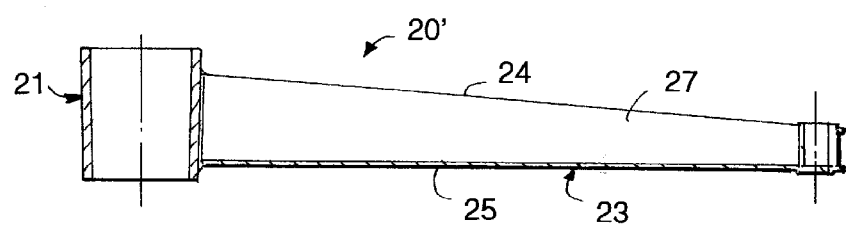
FIG. 3 is a cross section taken along the line III—III.

A chair base 20 (FIG. 1) embodying the present invention includes a tapered tubular center hub 21 shaped to receive a matingly shaped extendable post 19 for supporting a chair. The base 20 defines a longitudinal centerline 22, and a plurality of radially extending tubular legs 23 (FIG. 2) are attached to the hub 21 to form a spider-legged base frame assembly 20' that is covered by an aesthetic base frame cover 20" (FIG. 1). Each leg 23 (FIGS. 2 and 3) has top, bottom, and opposing sidewalls 24-27, respectively, defining a rectangular cross section that decreases as the leg 23 extends from the hub 21. The top and bottom walls 24 and 25 (FIG. 7) each has an arcuately shaped end 28 that is welded to the center hub 21 by top and bottom ring welds 29 and 30 (FIG. 5). The sidewalls 26 and 27 of each leg 23 have enlarged wall sections 31 and 32 that are flat and substantially parallel. The sidewalls 26 and 27 further have bent flanges 33 and 34 (FIG. 4) adjacent the hub 21 that are angled inwardly from the enlarged wall sections 31 and 32, respectively, toward the longitudinal centerline 22 of the hub 21. The bent flanges 33 and 34 are oriented approximately radially from the centerline 22 to provide optimal structure and to provide clearance 35 between adjacent legs 23. The clearance 35 prevents interference between adjacent legs 23 despite dimensional variation in the legs 23 from manufacturing and tolerance considerations, thus facilitating assembly.

The hub 21 is formed from a constant-thickness wall to define a tapered one-piece tubular shape, with the constant-thickness wall having an inner surface 36 (FIG. 5) defining a larger upper diameter 37 and a smaller lower diameter 38. The inner surface 36 defines a taper for mateably receiving and stably supporting a tapered chair-supporting post 19. By this arrangement, the one-piece hub 21 itself is configured to receive the tapered bend 39 of the chair-supporting post 19 (FIG. 1), and it does not require an insert in order to form a tapered socket for receiving the chair-supporting post 19. Advantageously, this saves cost and reduces components needed for assembly.

Preferably, the wall thickness of the hub 21 is constant and is about 0.139 inches and has a vertical taper 40 of about 1 to 2 degrees, or more preferably has a vertical taper of slightly greater than 1 degree and 26 minutes from the longitudinal centerline 22. It is contemplated that the hub 21 can be made by cutting a section from a constant diameter tube, and then reforming the section by expanding the section from one end via die stamping techniques. By this process, the hub 21 is formed to a dimensionally accurate shape at low cost. The tapered hub 21 can be resized or restruck to improve its dimensional accuracy if desired.

The elongated shape, rectangular cross section, and hole construction of legs 23 are shown to a large extent in U.S. Pat. No. 5,906,343 and, accordingly, the entire contents and disclosure of U.S. Pat. No. 5,906,343 are incorporated herein by reference. However, the present legs 23 have a modified hub-engaging inner end that is different than that shown in U.S. Pat. No. 5,906,343. Specifically, the present leg 23 does not have any small angled rib on its bottom wall 25 adjacent the hub 21. (The bottom wall shown in U.S. Pat. No. 5,906,343 does have such a small angled rib, see FIG. 2.) Instead, the present leg 23 has the bent flanges 33 and 34 on the sidewalls 26 and 27. The bent flanges 33 and 34 are relatively flat and are about 0.100 to about 0.250 inches long, or more preferably are about 0.195 inches long and extend completely from a top to a bottom of the sidewalls 26 and 27. Preferably, the tapered bend 39 that connects the bent flanges 33 and 34 to the sidewalls 26 and 27 is slightly radiused to prevent concentration of stresses and cracking at the bend 39, but the bend 39 is well-formed and well-defined, such that most of the material of the bent flanges 33 and 34 is relatively flat. These dimensions are appropriate for a leg 23 having a sidewall height of about 1.73 inches tall and a bottom wall 25 of about 1.40 inches wide at the hub 21. Naturally, these dimensions may change depending upon the functional requirements of a particular base construction being designed, and depending on the material of the legs 23 and the hub 21. It is contemplated that the bent flanges 33 and 34 optimally are oriented toward the centerline 22, although it is contemplated to be within a scope of the present invention even if the bent flanges are not perfectly positioned with this orientation. It is noted that part of the benefit of the bent flanges 33 and 34 is the work hardening that occurs when forming the bent flanges 33 and 34, which results in stiffening and rigidifying the sidewalls 26 and 27 at the hub 21. A second benefit is the additional clearance 35 between the sidewalls 26 and 27 of adjacent legs 21. This clearance 35 allows all legs 23 to be properly fitted against the hub 21, even with the dimensional variations that occur when forming the legs 23.

Testing has shown that, with careful control of the welding process for forming top and bottom ring welds 29 and 30, the bent flanges 33 and 34 do not need to touch or engage the outer surface of the hub 21. Depending on the functional requirements of the chair base 20 and the welding process, the arcuate-shaped ends 28 on top and bottom walls 24 and 25 may also not engage the hub 21 when fixtured around the hub 21 prior to welding.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A chair base comprising:

a tubular center hub defining a longitudinal centerline; and a plurality of radially extending tubular legs secured to the center hub, each leg having a top wall, a bottom wall, and opposing sidewalls that together define a hollow cavity, the top and bottom walls each having an arcuately shaped end adjacent the center hub, the sidewalls of each leg having enlarged wall sections that are flat and substantially parallel, the sidewalls further having bent flanges formed integrally from contiguous material of the sidewalls at an end adjacent the hub that are angled inwardly from an associated one of the enlarged wall sections toward the longitudinal centerline, wherein the bent flanges on specific ones of the legs are spaced from the bent flanges on adjacent ones of the legs.

2. The chair base defined in claim 1, wherein the bent flanges each include a flat wall portion.

3. The chair base defined in claim 2, including top and bottom ring welds that extend around the hub securing the top and bottom walls of each leg to the hub.

4. The chair base defined in claim 3, wherein the hub is tubular and tapered, with an upper end of an inner surface of the tapered hub defining a larger diameter than a lower end of the inner surface.

5. The chair base defined in claim 4, wherein the hub has a taper from 1 to 2 degrees with respect to the centerline of the hub.

6. The chair base defined in claim 5, wherein each of the bent flanges has a radial length of about 0.100 to 0.250 inches.

7. The chair base defined in claim 1, wherein the bent flanges each include a flat wall portion.

8. The chair base defined in claim 1, including top and bottom ring welds that extend around the hub securing the top and bottom walls of each leg to the hub.

9. The chair base defined in claim 1, wherein the hub has a taper from 1 to 2 degrees with respect to the centerline of the hub.

10. The chair base defined in claim 1, wherein each of the bent flanges has a radial length of about 0.100 to 0.250 inches.

11. A chair base comprising:

a tubular center hub defining a longitudinal centerline; and a plurality of radially extending tubular legs secured to the center hub, each leg having a top wall, a bottom wall, and opposing sidewalls that together define a hollow cavity, the top and bottom walls each having an arcuately shaped end adjacent the center hub, the sidewalls of each leg having enlarged wall sections that are flat and substantially parallel, the sidewalls further having bent flanges formed integrally from contiguous material of the sidewalls at an end adjacent the hub that are angled inwardly from an associated one of the enlarged wall sections toward the longitudinal centerline, wherein the hub is tubular and tapered, with an upper end of an inner surface of the tapered hub defining a larger diameter than a lower end of the inner surface.

12. A base for furniture, comprising:

a center hub; and a plurality of tubular legs, each tubular leg having a rectangular cross-sectional shape defined by a top wall, a bottom wall, and opposing sidewalls, the tubular leg having a hub-engaging end with the top and bottom walls each having an arcuately shaped end engaging the center hub, the sidewalls of the leg having enlarged wall sections that are flat and substantially parallel, the sidewalls further having bent flanges on the hub-engaging end, the bent flanges including flat portions that are bent at an acute angle inwardly from an associated one of the enlarged wall sections toward each other, the bent flanges being at least 0.100 inches wide and being spaced from the bent flanges of adjacent legs and engaging the center hub.

13. The base for furniture defined in claim 12, wherein the bent flanges each include a bent portion connecting the flat portions to the associated wall sections.

* * * * *